(12) United States Patent
Mikawa

(10) Patent No.: US 9,976,498 B2
(45) Date of Patent: May 22, 2018

(54) CONTROL APPARATUS FOR INTERNAL COMBUSTION ENGINE AND CONTROL METHOD THEREFOR

(71) Applicant: Hitachi Automotive Systems, Ltd., Hitachinaka-shi, Ibaraki (JP)

(72) Inventor: Kentaro Mikawa, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days. days.

(21) Appl. No.: 15/123,459

(22) PCT Filed: Sep. 25, 2014

(86) PCT No.: PCT/JP2014/075491
§ 371 (c)(1),
(2) Date: Sep. 2, 2016

(87) PCT Pub. No.: WO2015/132993
PCT Pub. Date: Sep. 11, 2015

(65) Prior Publication Data
US 2017/0074179 A1     Mar. 16, 2017

(30) Foreign Application Priority Data

Mar. 4, 2014 (JP) ................................. 2014-041782

(51) Int. Cl.
*F01L 1/34* (2006.01)
*F02D 41/22* (2006.01)
(Continued)

(52) U.S. Cl.
CPC ............ *F02D 41/0002* (2013.01); *F01L 1/34* (2013.01); *F02D 13/0234* (2013.01);
(Continued)

(58) Field of Classification Search
CPC .... F02D 41/0002; F02D 41/062; F02D 41/22; F02D 41/26; F02D 41/28; F02D 13/02;
(Continued)

(56) References Cited

U.S. PATENT DOCUMENTS 5,738,053 A * 4/1998 Kato .................. F01L 1/34406
123/90.15
6,047,674 A * 4/2000 Kadowaki ............... F01L 1/344
123/198 D
(Continued)

FOREIGN PATENT DOCUMENTS

EP     2 022 971 A2     2/2009
JP     2005-90241 A     4/2005
(Continued)

OTHER PUBLICATIONS

International Preliminary Report on Patentability (PCT/IB/326, PCT/IB/338, & PCT/IB/373) issued in PCT Application No. PCT/JP2014/075491 dated Sep. 15, 2016, including English translation of document C2 (Japanese-language Written Opinion (PCT/ISA/237)) previously filed on Sep. 2, 2016 (fourteen (14) pages).
(Continued)

*Primary Examiner* — Mahmoud Gimie
(74) *Attorney, Agent, or Firm* — Crowell & Moring LLP

(57) ABSTRACT

The present invention relates to an internal combustion engine including a VTC controller for controlling driving of a variable valve timing device and an engine control module (ECM) for calculating and transferring a valve timing control command. In the present invention, each of the VTC controller and the ECM detects whether an abnormality of a communication circuit used for transferring a control command is present or not. If the abnormality is detected, the VTC controller and the ECM set a target value for an abnormal state with the same characteristic, and perform a control operation based on the target value in the abnormal
(Continued)

state. In this manner, a decrease in engine operability when an abnormality occurs in the communication circuit of a control command is suppressed.

9 Claims, 9 Drawing Sheets

(51) Int. Cl.
| | |
|---|---|
| *F02D 41/00* | (2006.01) |
| *F02D 41/06* | (2006.01) |
| *F02D 41/28* | (2006.01) |
| *F02D 13/02* | (2006.01) |
| *F02N 19/00* | (2010.01) |
| *F02D 41/26* | (2006.01) |
| *F02D 41/08* | (2006.01) |
| *F02N 11/00* | (2006.01) |

(52) U.S. Cl.
CPC ..... *F02D 13/0238* (2013.01); *F02D 13/0261* (2013.01); *F02D 41/062* (2013.01); *F02D 41/22* (2013.01); *F02D 41/26* (2013.01); *F02D 41/28* (2013.01); *F02N 19/004* (2013.01); *F02D 41/064* (2013.01); *F02D 41/08* (2013.01); *F02D 2041/001* (2013.01); *F02D 2200/021* (2013.01); *F02D 2200/101* (2013.01); *F02D 2200/1012* (2013.01); *F02D 2200/503* (2013.01); *F02N 11/00* (2013.01); *F02N 2200/063* (2013.01); *Y02T 10/18* (2013.01); *Y02T 10/42* (2013.01)

(58) Field of Classification Search
CPC ............. F02D 13/0234; F02D 13/0238; F02D 13/0261; F01L 1/34; F02N 19/004
USPC .............................. 701/102, 114; 123/90.15
See application file for complete search history.

(56) References Cited

U.S. PATENT DOCUMENTS

| | | | |
|---|---|---|---|
| 2002/0062798 A1* | 5/2002 | Iwaki | F01L 1/34 123/90.15 |
| 2005/0081809 A1 | 4/2005 | Tani | |
| 2006/0180122 A1 | 8/2006 | Maekawa et al. | |
| 2009/0043483 A1 | 2/2009 | Abe et al. | |
| 2009/0088954 A1 | 4/2009 | Machida | |
| 2009/0288620 A1* | 11/2009 | Murai | F01L 1/344 123/90.15 |
| 2010/0332110 A1* | 12/2010 | Wada | F01L 1/022 701/106 |

FOREIGN PATENT DOCUMENTS

| | | |
|---|---|---|
| JP | 2006-220098 A | 8/2006 |
| JP | 2007-211710 A | 8/2007 |
| JP | 2009-41534 A | 2/2009 |
| JP | 2009-79577 A | 4/2009 |
| JP | 4269338 B2 | 5/2009 |
| JP | 2010-180750 A | 8/2010 |
| JP | 2013-227919 A | 11/2013 |

OTHER PUBLICATIONS

International Search Report (PCT/ISA/210) issued in PCT Application No. PCT/JP2014/075491 dated Oct. 28, 2014 with English-language translation (four (4) pages).

Japanese-language Written Opinion (PCT/ISA/237) issued in PCT Application No. PCT/JP2014/075491 dated Oct. 28, 2014 (five (5) pages).

Japanese Office Action issued in counterpart Japanese Application No. 2014-041782 dated Jun. 6, 2017 with English-language translation (seven (7) pages).

* cited by examiner

CONTROL APPARATUS FOR INTERNAL COMBUSTION ENGINE AND CONTROL METHOD THEREFOR

TECHNICAL FIELD

The present invention relates to a control apparatus and a control method for controlling a variable valve timing device that sets a valve timing of an internal combustion engine variable.

BACKGROUND ART

Patent Document 1 discloses a valve timing controller for adjusting a valve timing of an engine utilizing a rotational torque of a motor. The valve timing controller includes a driving circuit that receives a control signal generated by a control circuit and supplies a current to the motor to drive the motor based on a target value of a motor rotation speed represented by a frequency of the control signal, and the driving circuit stops the current supply to the motor when the frequency is lower than a threshold.

REFERENCE DOCUMENT LIST

Patent Document

Patent Document 1: Japanese Patent No. 4269338

SUMMARY OF THE INVENTION

Problems to be Solved by the Invention

If driving of an actuator of a variable valve timing device is stopped based on an abnormality of a control command, a valve timing might return to a mechanical default position by a cam reaction force in some cases.

In some engine operating states when the abnormality of the control command is detected, such a change of the valve timing to the mechanical default position might shift the valve timing from an appropriate valve timing in the operating state at this time so that engine operability such as startability and combustion stability might be impaired.

The present invention has been made in view of the foregoing problem, and has an object of providing a control apparatus and a control method for an internal combustion engine that can suppress a decrease in engine operability when an abnormality occurs in an input of a control command of a valve timing.

Means for Solving the Problems

In view of this, a control apparatus according to the present invention includes a processing unit that controls a variable valve timing device to a predetermined position shifted from a mechanical default position when abnormality occurs in an input of a control command that is externally input.

A control method according to the present invention includes the steps of: detecting whether an input abnormality of a control command is present or not; and controlling the variable valve timing device to a predetermined position shifted from a mechanical default position when the input abnormality is detected.

Effects of the Invention

According to the present invention described above, setting of a predetermined position can suppress a decrease of operability as compared to a case where a valve timing returns to a mechanical default position.

MODE FOR CARRYING OUT THE INVENTION

An embodiment of the present invention will be described hereinafter.

Figure 1:
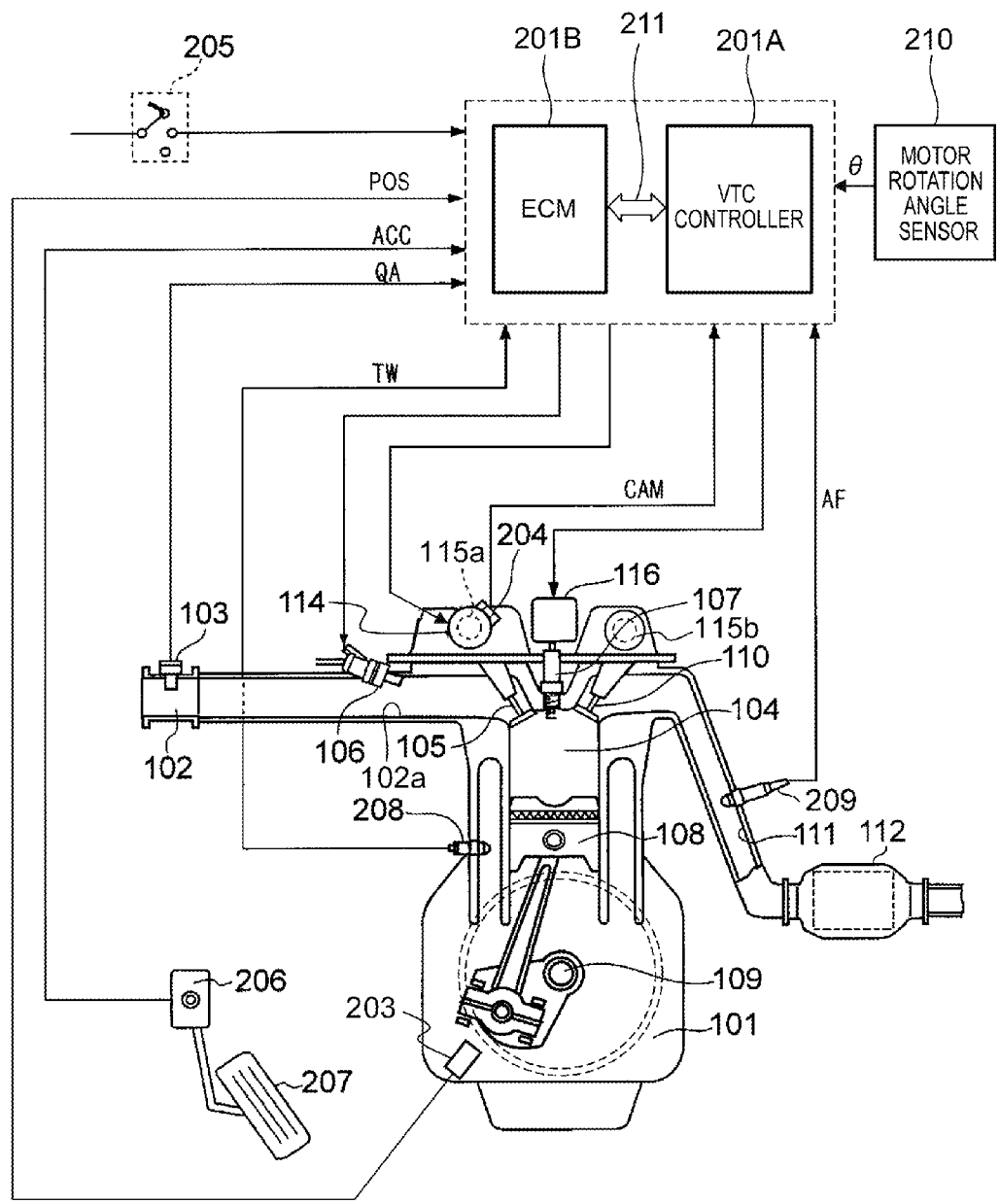
FIG. 1 is a system configuration diagram of an internal combustion engine according to an embodiment of the present invention.

FIG. 1 illustrates an example internal combustion engine to which a control apparatus and a control method according to the present invention are applied.

An internal combustion engine 101 is mounted on a vehicle and is used as a power source.

Internal combustion engine 101 has an inlet duct 102 provided with an intake air flow rate sensor 103 for detecting an intake air flow rate QA of internal combustion engine 101.

An inlet valve 105 opens and closes an inlet port of a combustion chamber 104 of each cylinder.

An inlet port 102a disposed upstream of inlet valve 105 is provided with a fuel injection valve 106 in each cylinder.

Internal combustion engine 101 illustrated in FIG. 1 is a so-called port injection type internal combustion engine in which fuel injection valve 106 injects fuel into inlet port 102a, but may be a so-called cylinder direct injection type internal combustion engine in which fuel injection valve 106 injects fuel directly into combustion chamber 104.

Fuel injected from fuel injection valve 106 is sucked together with air into combustion chamber 104 through inlet valve 105, and is ignited and burns by spark ignition with an ignition plug 107. A pressure generated by this combustion pushes a piston 108 down to a crank shaft 109 so that crank shaft 109 is driven to rotate.

An exhaust valve 110 opens and closes an exhaust port of combustion chamber 104, and when exhaust valve 110 opens, exhaust gas in combustion chamber 104 is discharged to an exhaust pipe 111.

Exhaust pipe 111 includes a catalyst converter 112 including, for example, a three-way catalyst, and exhaust gas is purified by catalyst converter 112.

Inlet valve 105 is opened by rotation of an intake camshaft 115a that is driven to rotate by crank shaft 109. Exhaust valve 110 is opened by rotation of an exhaust camshaft 115b that is driven to rotate by crank shaft 109.

A variable valve timing device 114 is, for example, an electric variable valve timing device that continuously changes a phase of a valve operating angle of inlet valve 105, that is, a valve timing of inlet valve 105, in an advance direction and a retard direction by changing a relative rotational phase angle of intake camshaft 115a with respect to crank shaft 109 with a motor serving as an actuator.

As electric variable valve timing device 114, a mechanism disclosed in Japanese Patent Application Laid-open Publication No. 2013-227919 may be employed, for example. Variable valve timing device 114 is not limited to an electric mechanism, and may be a known hydraulic or electromagnetic mechanism when necessary.

An ignition module 116 for supplying ignition energy to ignition plug 107 provided in each cylinder is directly attached to ignition plug 107. Ignition module 116 includes an ignition coil and a power transistor for controlling electrification to the ignition coil.

As control units, provided are a VTC controller 201A as a first control unit for controlling of driving of variable valve timing device 114 and an engine control module (ECM) 201B as a second control unit or an external control apparatus for controlling, for example, fuel injection valve 106 and ignition module 116.

Each of VTC controller 201A and engine control module 201B includes a microcomputer including a CPU, a RAM, and a ROM, for example, and calculates a manipulated variable of each device by performing a computation process based on a program previously stored in a memory such as a ROM.

VTC controller 201A includes a driving circuit such as an inverter for driving a motor of variable valve timing device 114.

VTC controller 201A and ECM 201B are configured to perform data transfer to each other through a controller area network (CAN) 211.

CAN 211 serving as a communication circuit is connected to VTC controller 201A and ECM 201B and also to an AT controller for controlling an automatic transmission to be combined with, for example, internal combustion engine 101.

Sensors for detecting an operating state of internal combustion engine 101 include, in addition to intake air flow rate sensor 103, a crank angle sensor 203 for outputting a rotation angle signal POS of crank shaft 109, an accelerator position sensor 206 for detecting a depression amount of, that is, an accelerator position ACC, of an accelerator pedal 207, a cam angle sensor 204 for outputting a rotation angle signal CAM of intake camshaft 115a, a water temperature sensor 208 for detecting a temperature TW of cooling water of internal combustion engine 101, an air-fuel ratio sensor 209 disposed in exhaust pipe 111 upstream of catalyst converter 112 and used for detecting an air-fuel ratio AF based on an oxygen concentration in exhaust gas, and a motor rotation angle sensor 210 for detecting a rotation angle θ of a motor that is an actuator of variable valve timing device 114, for example.

VTC controller 201A and ECM 201B detect an operating state of internal combustion engine 101 based on, for example, detection signals of the sensors described above and an on/off signal of an ignition switch 205 that is a main switch for operation and stopping of internal combustion engine 101. Based on the detected engine operating state, VTC controller 201A and ECM 201B perform a control process.

Figure 2:
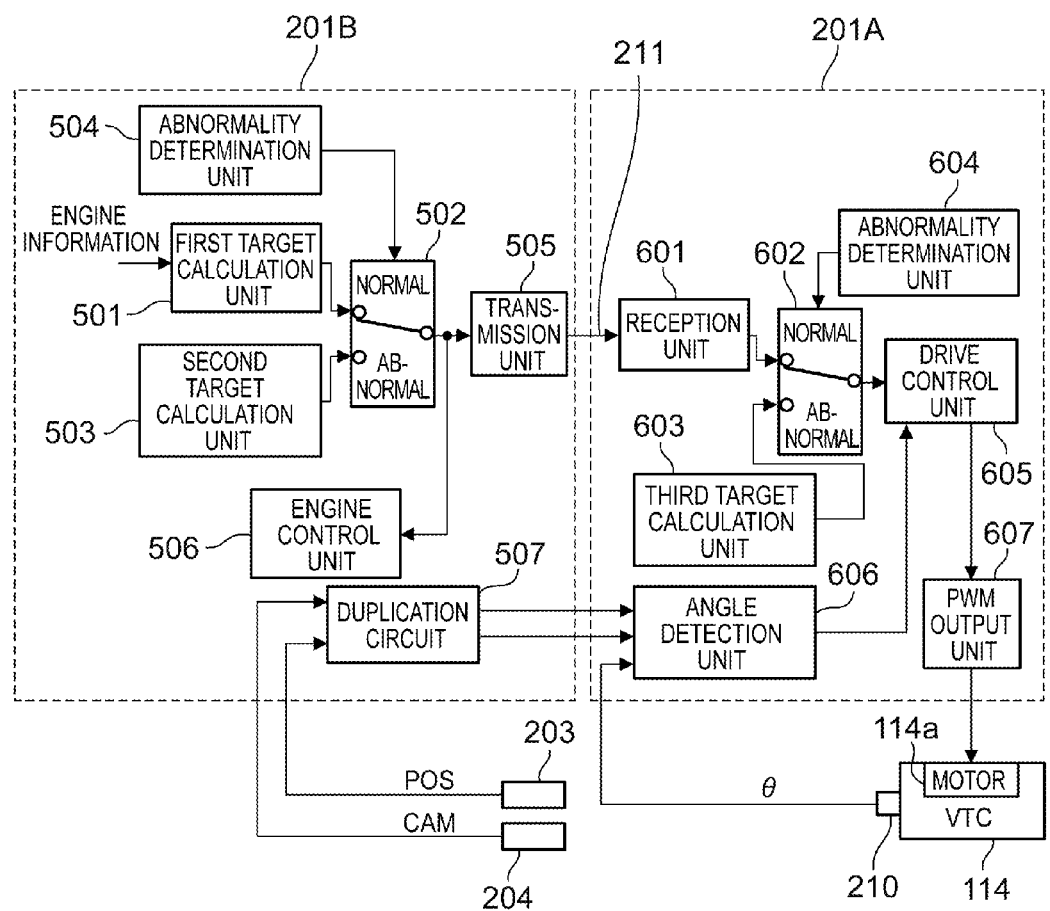
FIG. 2 is a block diagram illustrating examples of functions of a VTC controller and an ECM according to an embodiment of the present invention.

FIG. 2 is a block diagram illustrating examples of functions of VTC controller 201A and ECM 201B.

ECM 201B receives signals from crank angle sensor 203 and cam angle sensor 204, and although not illustrated in FIG. 2, also receives signals from intake air flow rate sensor 103, accelerator position sensor 206, water temperature sensor 208, and air-fuel ratio sensor 209, and a signal from ignition switch 205.

A first target calculation unit 501 of ECM 201B calculates a target phase angle TGPAb of variable valve timing device 114 based on an engine operating state such as an engine load and an engine rotation speed. Target phase angle TGPAb corresponds to a target valve timing, a target value, and a control command value of the valve timing, for example.

Data of target phase angle TGPAb output from first target calculation unit 501 is output to a switching unit 502.

Switching unit 502 receives data of target phase angle TGPAb calculated by first target calculation unit 501 and data of a target phase angle TGPAa that is applied when an abnormality occurs in data transfer through CAN 211, and also receives, as a signal for specifying one of two target values, a signal indicating the presence/absence of an abnormality in data transfer through CAN 211, that is, a selection command signal.

In a case where data transfer through CAN 211 is normally performed, that is, in a state in which data of target phase angle TGPA is normally transferred to VTC controller 201A through CAN 211, switching unit 502 selects target phase angle TGPAb calculated by first target calculation unit 501 and outputs target phase angle TGPAb as a final target value TGPAf.

On the other hand, in a case where an abnormality occurs in data transfer through CAN 211, that is, in a state in which data of target phase angle TGPA is not normally transferred to VTC controller 201A through CAN 211, switching unit 502 selects target phase angle TGPAa and outputs target phase angle TGPAa as final target value TGPAf.

A second target calculation unit 503 calculates target phase angle TGPAa that is applied when an abnormality occurs in data transfer through CAN 211, and outputs target phase angle TGPAa.

An abnormality determination unit 504 determines whether an abnormality occurs in data transfer through CAN 211 or not, based on, for example, a signal transferred from VTC controller 201A through CAN 211.

Target phase angle TGPAf output from switching unit 502 is sent to a CAN transmission unit 505, and is also sent, as control information, to an engine control unit 506 that performs, for example, fuel injection control and ignition timing control.

CAN transmission unit 505 transfers data of target phase angle TGPAf to a reception unit 601 of VTC controller 201A through CAN 211.

VTC controller 201A outputs data of target phase angle TGPAf received by reception unit 601 to switching unit 602.

Switching unit 602 receives data of target phase angle TGPAf transferred from ECM 201B and data of target phase angle TGPAa that is applied when an abnormality occurs in data transfer through CAN 211, and also receives, as a signal for specifying one of two target values, a signal DIA indicating the presence/absence of an abnormality in data transfer through CAN 211.

In a case where data transfer through CAN 211 is normally performed, that is, in a state where data of target phase angle TGPA is normally received from ECM 201B through CAN 211, switching unit 602 selects target phase angle TGPAf transferred from ECM 201B and outputs target phase angle TGPAf as final target value TGPA.

On the other hand, in a case where an abnormality occurs in data transfer through CAN 211, that is, in a state in which data of target phase angle TGPA is not normally received from ECM 201B through CAN 211, switching unit 602 selects target phase angle TGPAa and outputs target phase angle TGPAa as final target value TGPA.

A third target calculation unit 603 calculates and outputs target phase angle TGPAa.

Here, target phase angle TGPAa output from third target calculation unit 603 in VTC controller 201A has the same value as target phase angle TGPAa output from second target calculation unit 503 in ECM 201B. In other words, third target calculation unit 603 and second target calculation unit 503 are configured to calculate and output target phase angle TGPAa with the same characteristics.

An abnormality determination unit 604 determines whether an abnormality occurs in data transfer through CAN 211 or not, based on, for example, a signal transferred from ECM 201B through CAN 211.

That is, VTC controller 201A and ECM 201B have functions of setting target phase angle TGPAa that is applied in an abnormal state of data transfer, and functions of individually determining the presence/absence of abnormality in data transfer through CAN 211 to select one of a target value calculated by ECM 201B and a target value for an abnormal state based on the determination result.

Data of target phase angle TGPA output from switching unit 602 is input to a drive control unit 605.

Drive control unit 605 receives data of target phase angle TGPA and a detection value ACPA of a rotational phase angle. Drive control unit 605 calculates a target current of a motor 114a of variable valve timing device 114 based on, for example, a deviation between target phase angle TGPA and detection value ACPA in such a manner that detection value ACPA approaches target phase angle TGPA.

An angle detection unit 606 receives rotation angle signal POS of crank angle sensor 203, rotation angle signal CAM of cam angle sensor 204, and a rotation angle signal θ of motor rotation angle sensor 210, and based on these signals, detects a rotational phase angle of intake camshaft 115a with respect to crank shaft 109, and outputs detection value ACPA of the rotational phase angle to drive control unit 605.

Rotation angle signal POS of crank angle sensor 203 and rotation angle signal CAM of cam angle sensor 204 received by angle detection unit 606 are signals transmitted from a duplication circuit 507 of ECM 201B to VTC controller 201A through dedicated signal lines 212a and 212b.

Duplication circuit 507 of ECM 201B is directly connected to crank angle sensor 203 and cam angle sensor 204, duplicates received rotation angle signals POS and CAM, and transmits the duplicated signals to angle detection unit 606 of VTC controller 201A.

That is, VTC controller 201A and ECM 201B are configured to receive rotation angle signals POS and CAM not through CAN 211, and even in a case where an abnormality of CAN 211 occurs, VTC controller 201A and ECM 201B can receive rotation angle signals POS and CAM and use the signals as control information.

Rotation angle signals POS and CAM duplicated by VTC controller 201A may be transmitted to ECM 201B through dedicated signal lines.

A PWM output unit 607 receives a target current output from drive control unit 605, and determines a duty ratio in pulse width modulation (PWM) control based on the target current, and controls electrification of motor 114a based on a PWM control signal of the duty ratio.

VTC controller 201A and ECM 201B illustrated in the functional block diagram of FIG. 2 operate in the following manner.

In a state where data transfer through CAN 211 is normally performed, both abnormality determination unit 504 of ECM 201B and abnormality determination unit 604 of VTC controller 201A determine that CAN communication is normal.

When receiving normal determination of CAN 211, switching unit 502 of ECM 201B outputs target phase angle TGPAb calculated by first target calculation unit 501, and target phase angle TGPAb is transferred to VTC controller 201A through normal CAN 211.

When receiving normal determination of CAN 211, switching unit 602 of VTC controller 201A outputs target phase angle TGPAb transferred from ECM 201B through CAN 211. Based on target phase angle TGPAb, that is, a target value that is set at a variable value based on an engine operating state, drive control unit 605 controls driving of variable valve timing device 114.

In this manner, the valve timing of inlet valve 105 is controlled at an optimum value based on the engine operating state.

On the other hand, in the abnormal state of CAN 211 in which data transfer through CAN 211 is not normally performed, VTC controller 201A cannot receive data of target phase angle TGPA from ECM 201B through CAN 211.

At this time, both abnormality determination unit 504 of ECM 201B and abnormality determination unit 604 of VTC controller 201A determine that an abnormality occurs in CAN communication so that switching unit 502 of ECM 201B selects and outputs target phase angle TGPAa output from second target calculation unit 503, and switching unit 602 of VTC controller 201A selects and outputs target phase angle TGPAa output from third target calculation unit 603.

Here, second target calculation unit 503 in ECM 201B and third target calculation unit 603 in VTC controller 201A calculate and output target phase angle TGPAa of the same value, and target phase angle TGPAa is calculated as a fixed position displaced from a mechanical default position of variable valve timing device 114.

In variable valve timing device 114 that sets the valve timing of inlet valve 105 variable, the default position is at a most retarded angle in a phase variable range that is mechanically defined by a stopper. Target phase angle TGPAa is previously stored in a memory in each of ECM 201B and VTC controller 201A as a phase angle shifted to an advanced side from the most retarded angle position that is the default position.

If control of variable valve timing device 114 is stopped when VTC controller 201A cannot receive target phase angle TGPA from ECM 201B, that is, a control command of the valve timing, anymore, the valve timing of inlet valve 105 returns to the default position that is the most retarded position under the influence of a cam reaction force. In this case, operability in an engine operating state in which a valve timing advanced from the most retarded position is required decreases.

For example, in a case where there is a request that the valve timing of inlet valve 105 is advanced from the most retarded position in starting internal combustion engine 101, if the valve timing is fixed at the most retarded position because of a CAN abnormality, internal combustion engine 101 cannot be started. In an acceleration state in which the rotation speed of internal combustion engine 101 is increased, if the timing is fixed at the most retarded position because of CAN abnormality, the valve overlap amount becomes excessively small. For this reason, for example, combustion stability might degrade.

In view of this, target phase angle TGPAa is adjusted as a fixed valve timing that enables starting of internal combustion engine 101 and sufficiently suppresses degradation of combustion stability of internal combustion engine 101, for example. In a CAN abnormal state, VTC controller 201A controls variable valve timing device 114 based on target phase angle TGPAa.

Thus, even when a CAN abnormality occurs, internal combustion engine 101 can be started. In addition, the operation of internal combustion engine 101 can be continued so that a vehicle using internal combustion engine 101 as a power source can be moved to a safe place.

When a CAN abnormality occurs, target phase angle TGPAa is also selected in ECM 201B instead of target phase angle TGPAb that is selected in a normal state. ECM 201B assumed that variable valve timing device 114 is controlled toward target phase angle TGPAa, and controls, for example, the fuel injection amount and an ignition timing of internal combustion engine 101. Thus, internal combustion engine 101 can be controlled based on a valve timing that is actually used as a control target in VTC controller 201A.

In a case where ECM 201B has the function of comparing target phase angle TGPA and an actual rotational phase detected based on rotation angle signals POS and CAM to determine a failure in variable valve timing device 114 and/or VTC controller 201A, even when abnormality occurs in CAN 211, a valve timing that is actually used as a control target in VTC controller 201A can be used as diagnostic information so that a diagnostic error in finding an abnormality of a valve timing control system can be reduced.

Thus, in a case where ECM 201B has the function of performing a process such as shutting off a power supply to a driving circuit of variable valve timing device 114 when it is determined that an abnormality occurs in the valve timing control system, for example, an erroneous shutting off of power supply to the driving circuit in spite of control of variable valve timing device 114 to the target value in VTC controller 201A can be suppressed.

Since the valve timing returns to the most retarded position when power supply to the driving circuit is shut off, erroneous shut-off of power supply to the driving circuit can be suppressed. Thus, VTC controller 201A can control the valve timing to target phase angle TGPAa, thereby also suppressing degradation of engine operability in the CAN abnormal state.

In a case where VTC controller 201A controls variable valve timing device 114 based on target phase angle TGPAa because of CAN abnormality, ECM 201B restricts an increase of a load of internal combustion engine 101 to a degree lower than that in a normal state so that internal combustion engine 101 can operate within an engine load range where degradation of operability can be sufficiently suppressed.

In the example illustrated in the functional block diagram of FIG. 2, target phase angle TGPAa used in the abnormal state of CAN 211 is a uniform fixed value. Alternatively, target phase angle TGPAa may be variable based on an engine operating state.

Figure 3:
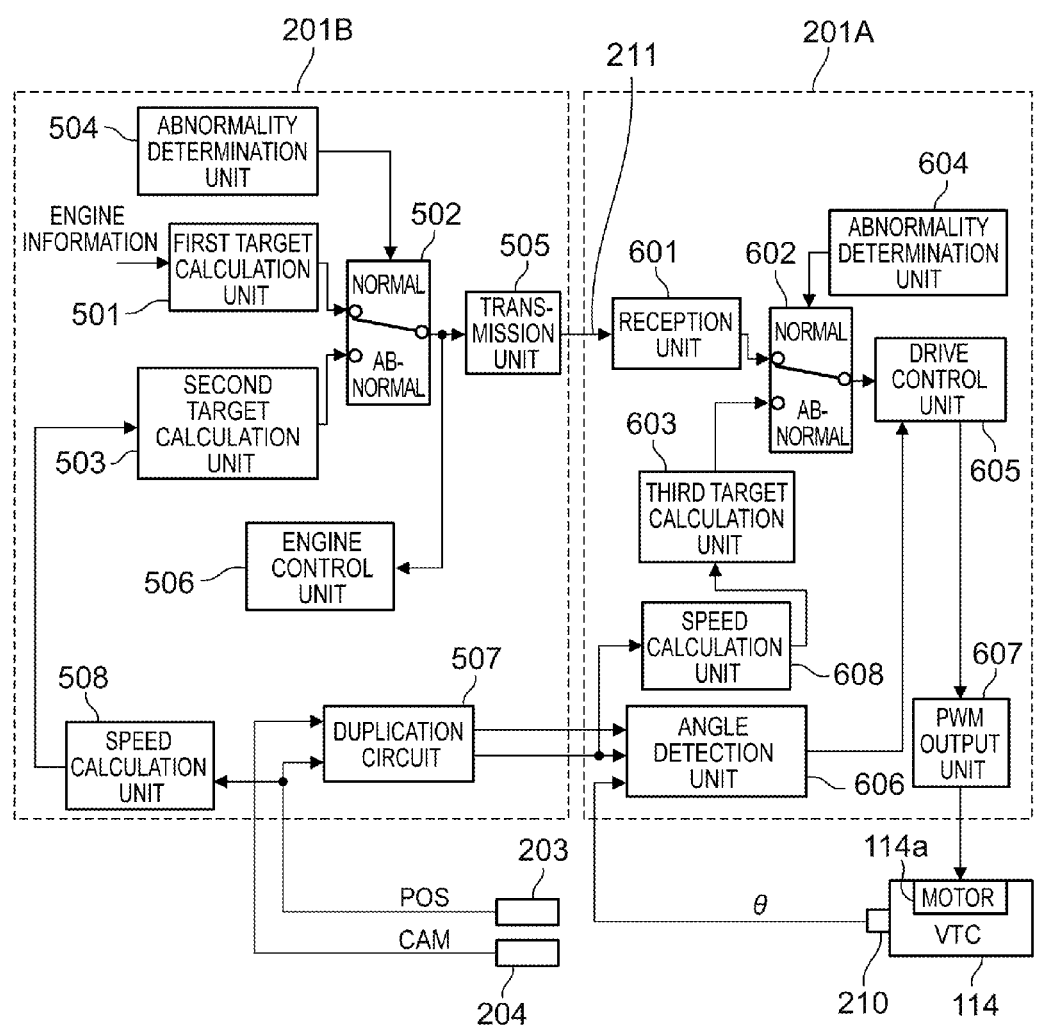
FIG. 3 is a block diagram illustrating examples of functions of the VTC controller and the ECM according to the embodiment of the present invention.

The functional block diagram of FIG. 3 illustrates an example configuration in which second target calculation unit 503 and third target calculation unit 603 set target phase angle TGPAa variable based on an engine operating state.

In FIG. 3, blocks already illustrated in FIG. 2 are denoted by the same reference numerals, and detailed description thereof will not be repeated.

In FIG. 3, ECM 201B includes a speed calculation unit 508 that calculates an engine rotation speed NE based on rotation angle signal POS output from crank angle sensor 203. Speed calculation unit 508 outputs data of calculated engine rotation speed NE to second target calculation unit 503.

Second target calculation unit 503 has the function of changing target phase angle TGPAa based on engine rotation speed NE.

VTC controller 201A includes a speed calculation unit 608 that calculates engine rotation speed NE based on rotation angle signal POS transmitted from duplication circuit 507 of ECM 201B. Speed calculation unit 608 outputs data of calculated engine rotation speed NE to third target calculation unit 603.

In a manner similar to second target calculation unit 503, third target calculation unit 603 has the function of changing target phase angle TGPAa based on engine rotation speed NE.

Here, second target calculation unit 503 and third target calculation unit 603 have the same characteristics in setting target phase angle TGPAa based on engine rotation speed NE, and set the same target phase angle TGPAa under the same conditions of engine rotation speed NE.

Figure 4:
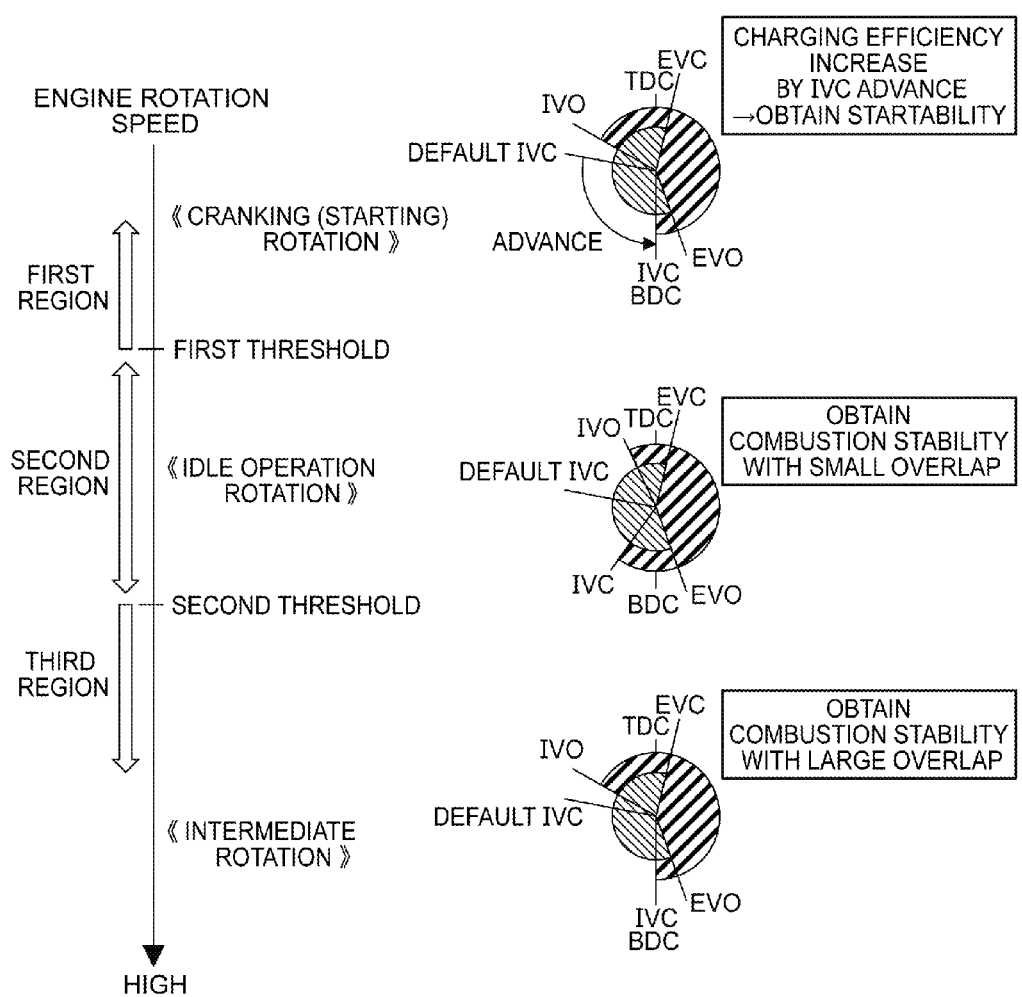
FIG. 4 illustrates an example of a correlation between an engine rotational speed and a target phase angle in an abnormal communication state in the embodiment of the present invention.

FIG. 4 illustrates an example of a process of setting target phase angle TGPAa based on engine rotation speed NE in second target calculation unit 503 and third target calculation unit 603, specifically an example in which different target phase angles TGPAa are set in individual regions of engine rotation speed NE.

FIG. 4 illustrates common characteristics in setting target phase angle TGPAa in second target calculation unit 503 and third target calculation unit 603, where TDC represents a top dead center, BDC is a bottom dead center, IVO represents an open period of inlet valve 105, IVC represents a closed period of inlet valve 105, EVO represents an open period of exhaust valve 110, and EVC represents a closed period of exhaust valve 110.

As illustrated in FIG. 4, second target calculation unit 503 and third target calculation unit 603 store target phase angle TGPAa for each of a plurality of regions of engine rotation speed, and select and output target phase angle TGPAa in a speed region corresponding to the current engine rotation speed.

In the example illustrated in FIG. 4, the engine rotation speed is divided into three regions, and different target phase angles TGPAa are set for the three regions.

In FIG. 4, a first rotation speed region where engine rotation speed NE is a first threshold or less is a rotation speed region where engine rotation speed NE is lower than an idle rotation speed of internal combustion engine 101 and corresponds to a rotation speed in a cranking state for starting internal combustion engine 101.

A second rotation speed region where engine rotation speed NE is higher than the first threshold and lower than a second threshold (where first threshold<second threshold) is a rotation speed region where engine rotation speed NE corresponds to a rotation speed in an idle operating state, that is, a no load state or a light load state, of internal combustion engine 101.

A third rotation speed region where engine rotation speed NE is higher than the second threshold is a rotation speed region where engine rotation speed NE corresponds to a rotation speed in an intermediate load state or a high load state where the load is higher than that in the idle state of internal combustion engine 101.

In the first rotation speed region where engine rotation speed NE corresponds to the rotation speed in the starting state of internal combustion engine 101, target calculation units 503 and 603 advance the valve timing of inlet valve 105 from the default position so that closed period IVC of inlet valve 105 approaches bottom dead center BDC and the amount of intake air in the starting state is larger than that in the default position, thereby obtaining startability of internal combustion engine 101.

In other words, target calculation units 503 and 603 set target phase angle TGPAa at a position advanced from the default position and cause closed period IVC to be located near bottom dead center BDC so that internal combustion engine 101 can also be started in the CAN abnormal state.

For example, in some cases, a variable range of a phase angle is set in such a manner that closed period IVC of inlet valve 105 when variable valve timing device 114 is at the default position is retarded from bottom dead center BDC and a delayed-closing mirror cycle is obtained, and a phase angle at the default position or near the default position is selected in operating conditions such as a constant low speed so that fuel efficiency is enhanced.

In a case where the variable range of the phase angle is set in the manner described above, a charging efficiency of internal combustion engine 101 decreases at the default position at which closed period IVC is retarded from bottom dead center BDC. Thus, if cranking is performed in a state where the valve timing of inlet valve 105 is at the default position, an insufficient amount of intake air can be obtained in the starting state of internal combustion engine 101 so that startability of internal combustion engine 101 decreases, resulting in the possibility of a failure in starting internal combustion engine 101.

In view of this, in a case where the rotation speed is in the first rotation speed region estimated as the starting state of internal combustion engine 101, target calculation units 503 and 603 set target phase angle TGPAa at a phase angle that is advanced from the default position and causes closed period IVC of inlet valve 105 to approach bottom dead center BDC as compared to closed period IVC at the default position so that a sufficient amount of intake air can be obtained in the starting state, and internal combustion engine 101 can be started with stability.

In second rotation speed region where internal combustion engine 101 is in the idle state, target calculation units 503 and 603 advance the valve timing of inlet valve 105 from the default position, but reduce the amount of advance from the default position as compared to that in the first rotation speed region so that excessive valve overlap is reduced. In this manner, combustion stability in an idle operation in the CAN abnormal state can be obtained so that sufficient resistance to engine stalling can be obtained.

In addition, in the third rotation speed region where the engine load increases as compared to the load in the idle state, since the engine rotation speed is higher than that in the idle state, an increase in the valve overlap amount can obtain combustion stability.

In view of this, in the third rotation speed region, target calculation units 503 and 603 set target phase angle TGPAa at a position advanced from that in the second rotation speed region and retarded from that in the first rotation speed region, and increase the valve overlap amount as compared to that in the second rotation speed region. Consequently, combustion stability in the intermediate load state can be obtained so that a sufficient resistance to engine stalling can be obtained.

As described above, in the CAN abnormal state, target phase angle TGPAa is changed based on the level of the engine rotation speed so that an actual valve timing can be changed based on the difference in a required valve timing due to the difference in the engine rotation speed. In addition, as compared to a case where target phase angle TGPAa is a fixed value, engine operability such as startability and combustion stability of internal combustion engine 101 in the CAN abnormal state can be enhanced.

In the example illustrated in FIG. 4, the rotation speed region is divided into two regions of an idle rotation region and a non-idle rotation region after starting of internal combustion engine 101. Alternatively, the rotation speed region can be more finely divided so that target phase angle TGPAa can be changed in finer steps.

For example, the rotation speed region may be divided into two regions of a low rotation region including a cranking state and an idle state and a high rotation region in which the rotation speed is higher than that in the idle state so that target calculation units 503 and 603 can switch target phase angle TGPAa between two values based on the engine rotation speed, and the engine rotation speed may be divided in any manner.

Figure 5:
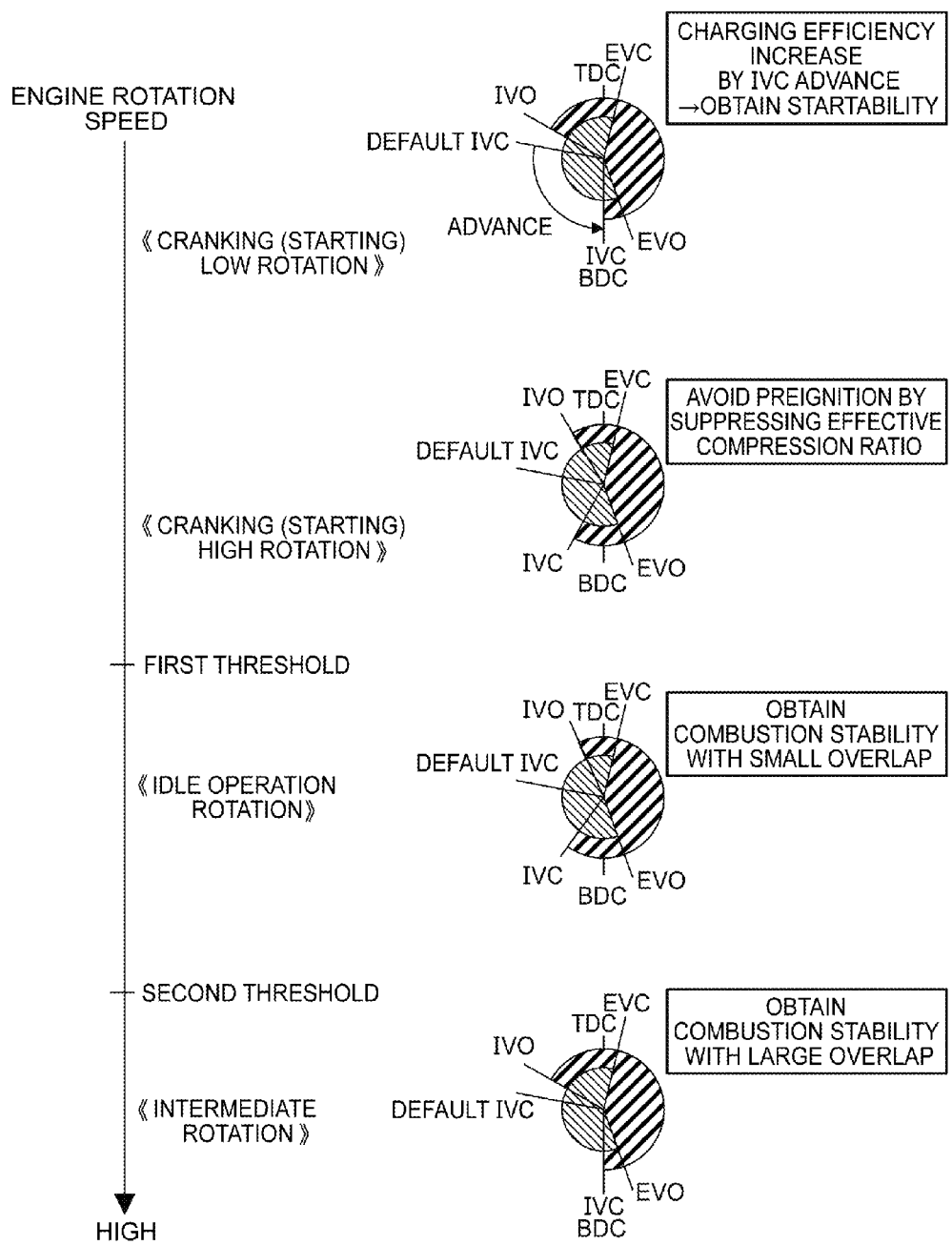
FIG. 5 illustrates an example of the correlation between the engine rotational speed and the target phase angle in the abnormal communication state in the embodiment of the present invention.

Since a required valve timing is different between starting in a cold start state and stating in a warming completion state even in the same cranking state, the engine rotation speed in the cranking state may be divided into the low rotation region in the cold start state and the high rotation region in the warming completion state as illustrated in FIG. 5 so that target phase angle TGPAa differs based on the difference in the cranking rotation speed.

That is, in starting in the cold start state, a large friction of internal combustion engine 101 causes the cranking rotation speed to be lower than that in starting in the warming completion state. Thus, in a case where the cranking rotation speed corresponds to the rotation speed in the low rotation region where the state is estimated as the cold start state, target phase angle TGPAa suitable for starting in the cold start state is set.

On the other hand, in a state that is the warming completion state and that a friction of internal combustion engine 101 is low, cranking rotation speed is higher than that in the cooling start state, and thus, in a case where the cranking rotation speed corresponds to the rotation speed in the high rotation region where the state is estimated as the warming completion state, target calculation units 503 and 603 set target phase angle TGPAa suitable for starting in the warming completion state.

For example, in the cooling start state, target calculation units 503 and 603 set target phase angle TGPAa with an advance amount with which closed period IVC of inlet valve 105 is near bottom dead center BDC, for example, to obtain startability. In starting in the warming completion state, to suppress occurrence of preignition, target calculation units 503 and 603 set an effective compression ratio lower than that in the cooling start state by retarding closed period IVC of inlet valve 105 after bottom dead center BDC as compared to that in the cooling start state.

In the examples illustrated in FIGS. 4 and 5, target calculation units 503 and 603 switch target phase angle TGPAa based on the level of engine rotation speed NE. Alternatively, as illustrated in the example of FIG. 6, target calculation units 503 and 603 may be configured to switch target phase angle TGPAa based on a change in engine rotation speed NE, specifically the direction and/or amount of the change.

Figure 6:
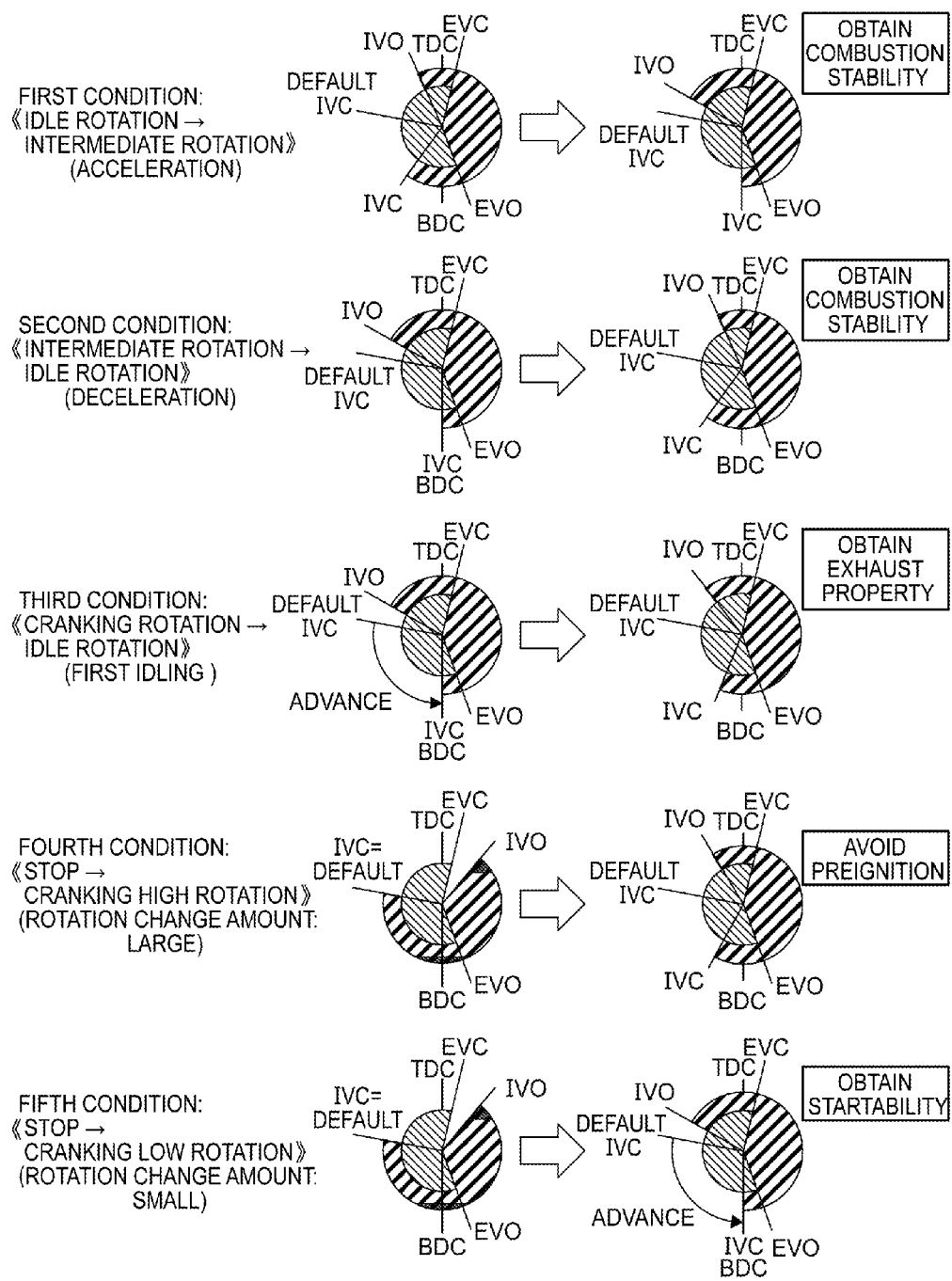
FIG. 6 illustrates an example of a correlation among the amount and direction of change of the engine rotational speed and the target phase angle in the abnormal communication state in the embodiment of the present invention.

In the example illustrated in FIG. 6, five conditions are provided based on a change in engine rotation speed NE, and target calculation units 503 and 603 switch target phase angle TGPAa for each of the five conditions.

Here, five conditions are: a first condition of an acceleration state in which an engine rotation speed increases from an idle rotation speed; a second condition of a deceleration state in which the engine rotation speed decreases from an increased state to the idle rotation speed; a third condition of a first idle state in which the engine rotation speed increases from a cranking rotation speed to the idle rotation speed; a fourth condition of a high-temperature starting state in which the engine rotation speed increases from an engine stop state to a high cranking rotation speed; and a fifth condition of a normal starting state in which the engine rotation speed increases from the engine stop state to a low cranking rotation speed.

In a case where the first condition is established, target calculation units 503 and 603 advance target phase angle TGPAa from target phase angle TGPAa that is advanced from the default position and has a small valve overlap amount applied in the idle state, to enlarge the valve overlap amount and maintain combustion stability, thereby obtaining combustion stability in the acceleration state.

In a case where the second condition is established, target calculation units 503 and 603 retard target phase angle TGPAa having a large valve overlap amount to target phase angle TGPAa that has a small valve overlap amount applied in the idle rotation speed state, thereby obtaining combustion stability in the deceleration state.

In a case where the third condition is established, that is, it is estimated that warming is performed, target calculation units 503 and 603 set target phase angle TGPAa advanced from the valve timing in an idle operation after warming, enlarge valve overlap by advance, and cause a back flow of intake air by the enlarged valve overlap to promote vaporization of fuel by the intake air back flow, thereby obtaining combustion stability during warming.

The fourth condition is a condition in which the cranking rotation speed is higher than those in low-temperature to normal-temperature starting condition, that is, the amount of increase in the rotation speed from the stop state is large so that it is estimated that internal combustion engine 101 in the starting state is in a perfectly warming state. In this fourth condition, target calculation units 503 and 603 set target phase angle TGPAa retarded to move closed period IVC of inlet valve 105 away from bottom dead center BDC as compared to the cooling start state, thereby reducing an effective compression ratio to suppress preignition.

The fifth condition is a condition in which the cranking rotation speed is lower than that in the high-temperature starting state, that is, the amount of increase in the rotation speed from the stop state is small, and the engine temperature in the starting state is estimated as a low-temperature to normal-temperature condition. In this condition, target calculation units 503 and 603 advance target phase angle TGPAa as compared to the fourth condition so that closed period IVC of inlet valve 105 approaches bottom dead center BDC, and thereby, a charging efficiency increases, thereby obtaining engine startability.

The first condition illustrated in FIG. 6 is the case of a rotation increase from idle rotation, and may be divided into, for example, a rotation increase condition from an idle rotation speed and a rotation increase condition from an intermediate rotation speed. Similarly, the first condition may be divided into a rotation decrease from a high rotation speed to the intermediate rotation speed and a rotation decrease from the intermediate rotation speed to the idle rotation speed.

As in the examples illustrated in FIGS. 4, 5, and 6, VTC controller 201A and ECM 201B may change target phase angle TGPAa based on engine rotation speed NE, and may change target phase angle TGPAa based on battery voltage VB used as a power supply of a starter motor.

Figure 7:
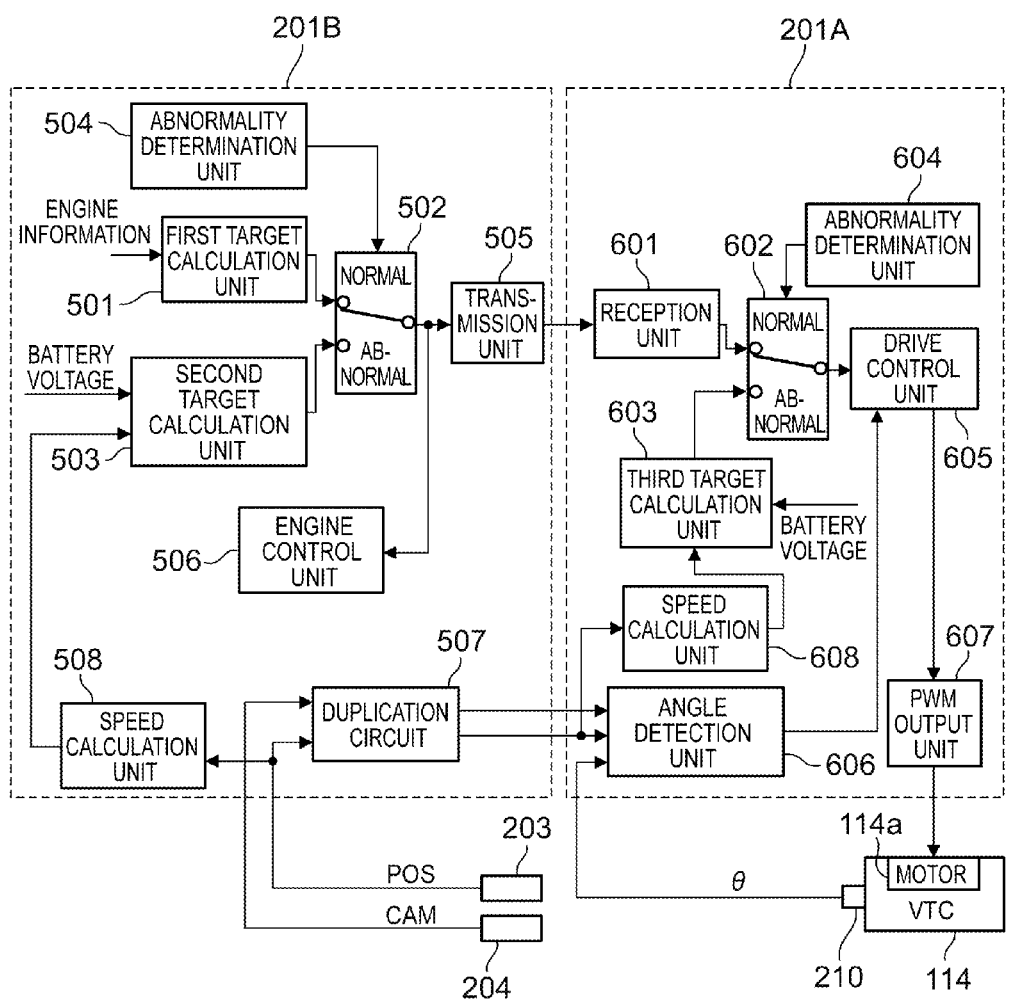
FIG. 7 is a block diagram illustrating examples of functions of the VTC controller and the ECM according to the embodiment of the present invention.

FIG. 7 is a functional block diagram of VTC controller 201A and ECM 201B in the case of changing target phase angle TGPAa in the CAN abnormal state based on engine rotation speed NE and battery voltage VB.

The functional block diagram of FIG. 7 is different from that of FIG. 3 in that third target calculation unit 603 and second target calculation unit 503 receive a signal of battery voltage VB together with a signal of engine rotation speed NE. Third target calculation unit 603 and second target calculation unit 503 illustrated in FIG. 7 change target phase angle TGPAa based on engine rotation speed NE and battery voltage VB.

Figure 8:
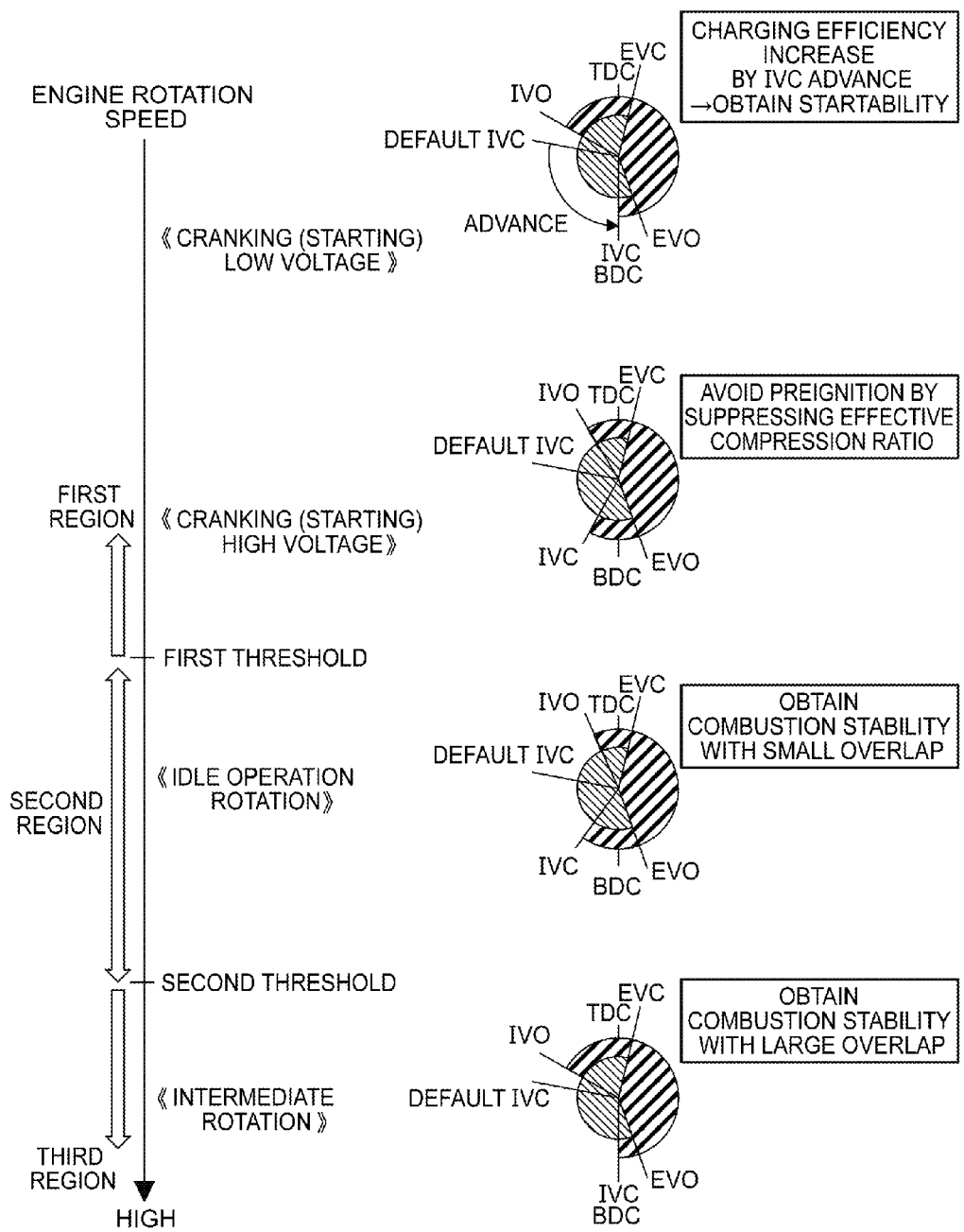
FIG. 8 illustrates an example of a correlation among the engine rotational speed, a battery voltage, and the target phase angle in the abnormal communication state in the embodiment of the present invention.

FIG. 8 illustrates an example of change of target phase angle TGPAa based on engine rotation speed NE and battery voltage VB. In the cranking rotation speed region in setting target phase angle TGPAa depending on the region of engine rotation speed NE illustrated in FIG. 4, target calculation units 503 and 603 change target phase angle TGPAa based on battery voltage VB.

Specifically, in a characteristic in changing target phase angle TGPAa in the example illustrated in FIG. 8, in a manner similar to the characteristic illustrated in FIG. 4, the region of engine rotation speed NE is divided into three regions of a cranking rotation speed region, an idle rotation speed region, and an intermediate rotation speed region. In a case where engine rotation speed NE is in the idle rotation speed region or the intermediate rotation speed region, target calculation units 503 and 603 set target phase angle TGPAa in a manner similar to the characteristic in the example illustrated in FIG. 4.

On the other hand, in a characteristic in changing target phase angle TGPAa in the example illustrated in FIG. 8, in a case where engine rotation speed NE is in the cranking rotation speed region, target calculation units 503 and 603 change target phase angle TGPAa based on battery voltage VB at the current time.

Specifically, in a case where battery voltage VB is higher than a set voltage, it is estimated that an ambient temperature of a battery is high. The case where the ambient temperature is high is estimated as a state where, in a case where the battery is placed in an engine compartment, the temperature of internal combustion engine 101 is high, that is, in a perfectly warming state.

On the other hand, in a case where battery voltage VB is lower than a set voltage, it is estimated that the ambient temperature of the battery is low. The case where the ambient temperature is low is estimated as a state where, in the case where the battery is placed in an engine compartment, the temperature of internal combustion engine 101 is in a low-temperature to normal-temperature state.

In view of this, in a case where battery voltage VB is lower than the set voltage and it is estimated that internal combustion engine 101 is started in the cold start state, target calculation units 503 and 603 set target phase angle TGPAa in such a manner that closed period IVC of inlet valve 105 is set near bottom dead center BDC and the amount of intake air is increased as quickly as possible to obtain startability.

On the other hand, in a case where battery voltage VB is higher than the set voltage and it is estimated that internal combustion engine 101 is started in the warming completion state, target calculation units 503 and 603 set target phase angle TGPAa that is retarded from that in a case where battery voltage VB is lower than the set voltage so that occurrence of preignition is suppressed by retarding closed period IVC of inlet valve 105 from that in the cooling start state to move closed period IVC away from bottom dead center BDC.

In the characteristic example illustrated in FIG. 8, target calculation units 503 and 603 set target phase angle TGPAa variable based on engine rotation speed NE and battery voltage VB. Alternatively, target calculation units 503 and 603 may set target phase angle TGPAa variable based on battery voltage VB without using information on engine rotation speed NE.

In a case where a rotational phase is changed by operating variable valve timing device 114 while internal combustion engine 101 is stopped, a motor torque cannot overcome a cam torque so that an actual phase does not change. Thus, a lock current is generated to cause overheating, which causes the possibility of a failure in variable valve timing device 114 or a motor driving circuit or a failure such as a pinch of a deceleration mechanism of a motor output shaft due to a lock torque.

Figure 9:
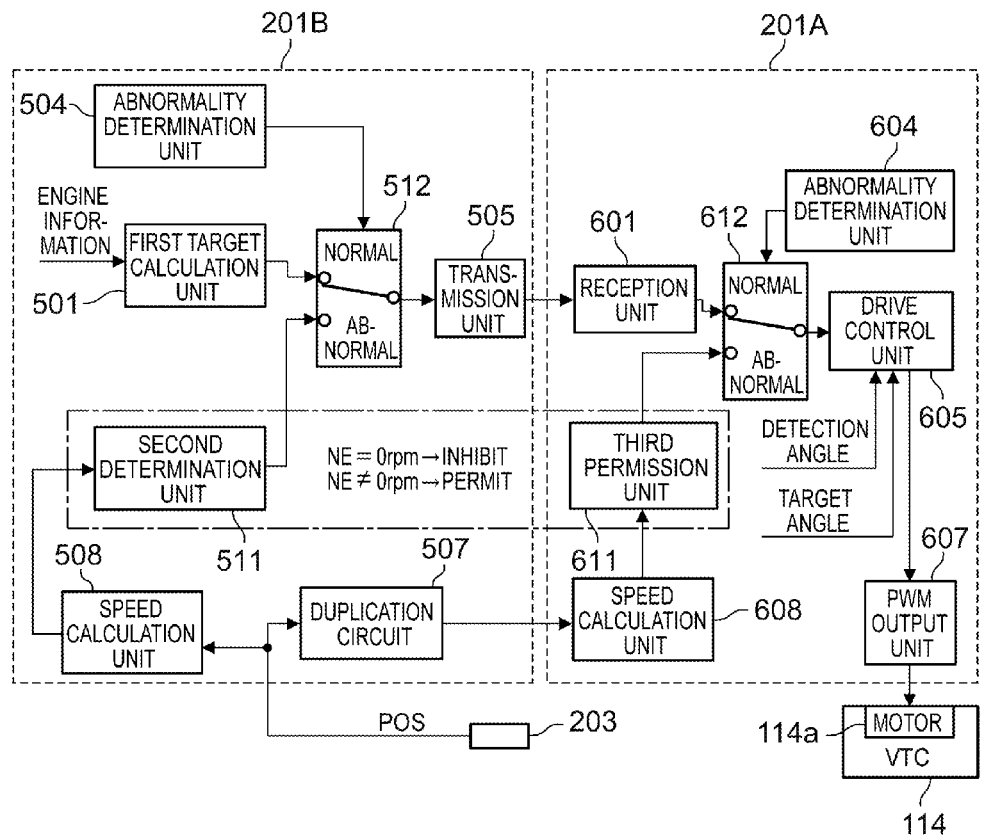
FIG. 9 is a block diagram illustrating examples of functions of the VTC controller and the ECM according to the embodiment of the present invention.

In view of this, with the configuration illustrated in the functional block diagram of FIG. 9, permission/inhibition of driving of variable valve timing device 114 in the CAN abnormal state can be instructed.

In the functional block diagram of FIG. 9, ECM 201B includes, as a determination unit for determining whether to permit driving of variable valve timing device 114 or not, a first determination unit 510 that determines permission of driving based on the states of internal combustion engine 101 and the vehicle, and a second determination unit 511 that determines whether to permit driving or not based on engine rotation speed NE.

ECM 201B further includes a switching unit 512 that receives a signal of permission/inhibition of first determination unit 510 and a signal of permission/inhibition of second determination unit 511, and selects and outputs one of these signals based on a diagnosis result of CAN communication.

A command signal indicating permission/inhibition of driving output from switching unit 512 is transferred to VTC controller 201A through CAN 211.

VTC controller 201A includes a third determination unit 611 that determines whether to permit driving based on engine rotation speed NE, and a switching unit 612 that receives an command signal indicating permission/inhibition of driving transferred from ECM 201B and an command signal indicating permission/inhibition of driving output from third determination unit 611 and selects and outputs one of these signals based on a diagnosis result of CAN communication.

Drive control unit 605 of VTC controller 201A controls driving of variable valve timing device 114 based on a target phase angle in a case where switching unit 612 outputs an command signal of driving permission. In a case where switching unit 612 outputs an command signal of driving inhibition, drive control unit 605 stops driving of variable valve timing device 114.

As described above, the target phase angle received by drive control unit 605 is a target value determined by selecting one of the target phase angle transferred from ECM 201B and the target phase angle calculated by third target calculation unit 603 based on the presence of a CAN abnormality. That is, although FIG. 9 does not illustrate blocks for setting the target phase angle, configurations of, for example, target calculation units 603 and 503 illustrated in FIGS. 2, 3, and 7 are provided.

In the CAN normal state, switching unit 512 in ECM 201B selects and outputs an command signal for permitting/inhibiting driving of first determination unit 510, whereas switching unit 512 in ECM 201B selects and outputs an command signal for permitting/inhibiting driving of second determination unit 511 in the CAN abnormal state.

Similarly, switching unit 612 in VTC controller 201A selects and outputs an command signal for permitting/inhibiting driving transferred from ECM 201B in the CAN normal state, whereas switching unit 612 in VTC controller 201A selects and outputs an command signal for permitting/inhibiting driving of third determination unit 611 in the CAN abnormal state.

Second determination unit 511 receives data of engine rotation speed NE calculated by speed calculation unit 508. Third determination unit 611 receives data of engine rotation speed NE calculated by speed calculation unit 508. Then, second determination unit 511 and third determination unit 611 output an command signal for inhibiting driving in the stop state of internal combustion engine 101 where engine rotation speed NE is 0 rpm, and output an command signal for permitting driving in a state where engine rotation speed NE is not 0 rpm and intake camshaft 115a rotates.

With the configuration illustrated in FIG. 9, even if VTC controller 201A cannot correctly receive an command signal for permitting/inhibiting driving set in ECM 201B because of a CAN abnormality, an command from third determination unit 611 is selected when the CAN abnormality occurs so that driving/driving stop is performed based on an command from third determination unit 611. Thus, it is possible to suppress driving of variable valve timing device 114 at least in the stop state of internal combustion engine 101.

Thus, it is possible to suppress occurrence of an overheat failure of a driving circuit or a pinch failure of a deceleration machine because of erroneous driving of variable valve timing device 114 when a CAN abnormality occurs in the stop state of internal combustion engine 101.

As described above, when a CAN abnormality occurs, VTC controller 201A switches from target phase angle transferred from ECM 201B to a target phase angle calculated by third target calculation unit 603, and continues driving control of variable valve timing device 114 by drive control unit 605. If the target phases angle changes stepwise because of occurrence of a CAN abnormality, however, an output of internal combustion engine 101, for example, might abruptly changes.

Figure 10:
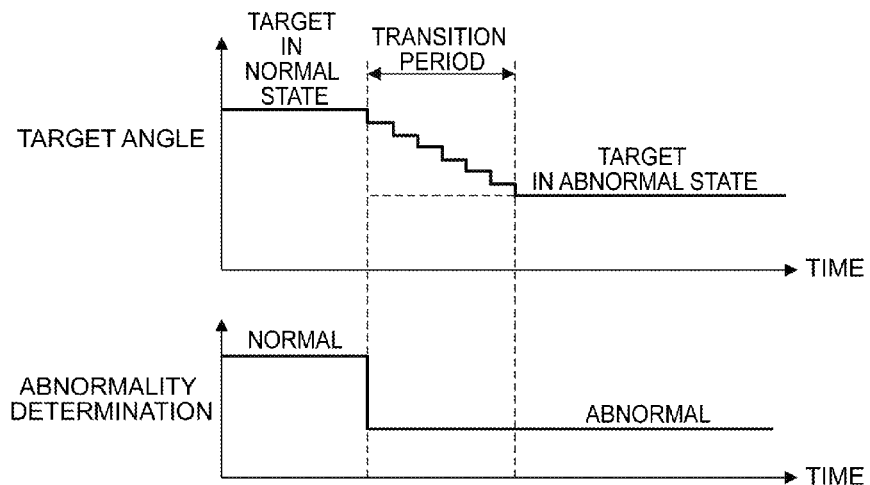
FIG. 10 is a time chart indicating an example of a change of the target phase angle in the abnormal communication state in the embodiment of the present invention.

In view of this, as illustrated in FIG. 10, a transition period in which a target phase angle in the CAN normal state gradually changes to a target phase angle in the CAN abnormal state is provided. Thus, it is possible to suppress an abrupt change of operability of internal combustion engine 101 because of occurrence of a CAN abnormality.

The present invention has been specifically described with reference to the preferred embodiment, but it is obvious for those skilled in the art that variations of the embodiment can be made based on the basic technical idea and teaching of the present invention.

In the foregoing embodiment, an example of control of variable valve timing device 114 that sets a valve timing of inlet valve 105 variable has been described. It is, however, apparent that a control apparatus and a control method according to the present invention can be applied to control of a variable valve timing device that sets a valve timing of exhaust valve 110 variable.

Target phase angle TGPAa can be set variable based on a combination of at least two of an engine rotation speed region, a battery voltage, a change direction of the engine rotation speed, and a change amount of the engine rotation speed.

Data communication between ECM 201B and VTC controller 201A is not limited to communication conforming to CAN standards, and may employ various known types of communication.

REFERENCE SYMBOL LIST 101 internal combustion engine
105 inlet valve
109 crank shaft
114 variable valve timing mechanism
114a motor
115a intake camshaft
201A VTC controller
201B engine control module (ECM)
203 crank angle sensor
204 cam angle sensor
210 motor rotation angle sensor
211 CAN

The invention claimed is:

1. A control apparatus for an internal combustion engine for controlling, based on an externally input control command, a variable valve timing device that sets a valve timing of an internal combustion engine variable, the control apparatus comprising:
a processing unit that controls the variable valve timing device to a predetermined position shifted from a mechanical default position when abnormality occurs in an input of the control command, wherein
the processing unit is configured to change the predetermined position based on at least one of an engine rotation speed, whether the internal combustion is in a starting state or not, and a temperature of the internal combustion engine in the starting state, and
the processing unit is configured to change the predetermined position among a plurality of regions of the engine rotation speed.

2. The control apparatus for the internal combustion engine according to claim 1, wherein
the processing unit is configured to change the predetermined position based on at least one of a direction or an amount of change of the engine rotation speed.

3. The control apparatus for the internal combustion engine according to claim 1, wherein
the abnormality in the input of the control command is a communication abnormality in communication between the control apparatus and a second control apparatus that outputs the control command and controls the internal combustion engine, and
when the communication abnormality occurs, the second control apparatus performs a control process of the internal combustion engine on an assumption that the variable valve timing device is controlled at the predetermined position.

4. The control apparatus for the internal combustion engine according to claim 1, wherein
the variable valve timing device is a device that sets a valve timing of an inlet valve of the internal combustion engine variable, and
the processing unit is configured to set the predetermined position at a position at which a closed period of the inlet valve is a first closed period near a bottom dead center in a starting state of the internal combustion engine in which a temperature of the internal combustion engine is lower than a predetermined temperature, and to set the predetermined position at a position at which the closed period of the inlet valve is retarded from that in the first closed period in a starting state of the internal combustion engine in which the temperature of the internal combustion engine is higher than the predetermined temperature.

5. The control apparatus for the internal combustion engine according to claim 1, wherein
the variable valve timing device is a device that sets a valve timing of an inlet valve of the internal combustion engine variable,
the default position is a position at which a closed period of the inlet valve is after a bottom dead center, and
the processing unit is configured to set the predetermined position at a position at which the closed period of the inlet valve is closer to the bottom dead center than the default position in a starting state of the internal combustion engine.

6. The control apparatus for the internal combustion engine according to claim 5, wherein
the processing unit is configured to set the predetermined position at a position at which the closed state of the inlet valve is retarded from the closed period in the starting state, in an idling state after starting the internal combustion engine.

7. The control apparatus for the internal combustion engine according to claim 6, wherein
the processing unit is configured to set the predetermined position at a position at which the closed period of the inlet valve is advanced from a closed period in the idling state, in a state where a rotation speed of the internal combustion engine is higher than an idling rotation speed.

8. The control apparatus for the internal combustion engine according to claim 1, wherein
the variable valve timing device is a device that sets a valve timing of an inlet valve of the internal combustion engine variable, and
the processing unit is configured to change the predetermined position in such a manner that a closed period of the inlet valve is closer to a bottom dead center than a closed period in an idling operation when the internal combustion engine is accelerated from an idling state.

9. A control method for an internal combustion engine, the method being used for controlling, based on an externally input control command, a variable valve timing device that sets a valve timing of the internal combustion engine variable, the method comprising the steps of:

detecting whether an input abnormality of the control command is present or not;
controlling the variable valve timing device to a predetermined position shifted from a mechanical default position when the input abnormality is detected; and
changing the predetermined position based on an engine rotation speed, wherein
the processing unit is configured to change the predetermined position among a plurality of regions of the engine rotation speed.

* * * * *